(12) United States Patent
Zigdon et al.

(10) Patent No.: US 12,038,701 B2
(45) Date of Patent: Jul. 16, 2024

(54) METHODS FOR PRINTING ON A SUBSTRATE AND RELATED ASPECTS

(71) Applicant: Hewlett-Packard Development Company, L.P., Spring, TX (US)

(72) Inventors: Chen Zigdon, Nes Ziona (IL); Liora Braun, Nes Ziona (IL); Mirit Shitrit, Nes Ziona (IL); Inna Tzomik, Nes Ziona (IL); Regina Guslitzer, Nes Ziona (IL)

(73) Assignee: Hewlett-Packard Development Company, L.P., Spring, TX (US)

( * ) Notice: Subject to any disclaimer, the term of this patent is extended or adjusted under 35 U.S.C. 154(b) by 186 days.

(21) Appl. No.: 17/635,063

(22) PCT Filed: Jan. 17, 2020

(86) PCT No.: PCT/US2020/014043
§ 371 (c)(1),
(2) Date: Feb. 14, 2022

(87) PCT Pub. No.: WO2021/145887
PCT Pub. Date: Jul. 22, 2021

(65) Prior Publication Data
US 2022/0291609 A1    Sep. 15, 2022

(51) Int. Cl.
*G03G 15/10*   (2006.01)
*C09D 5/00*    (2006.01)
*C09D 11/02*   (2014.01)

(52) U.S. Cl.
CPC .............. *G03G 15/10* (2013.01); *C09D 5/002* (2013.01); *C09D 11/02* (2013.01)

(58) Field of Classification Search
CPC .... G03G 15/10; G03G 7/0053; G03G 7/0073; G03G 7/008; G03G 9/13; C09D 5/002; C09D 11/02; C09D 11/033; C09D 11/102; C09D 11/107; C09D 11/54; C09D 179/02; C08L 63/00
See application file for complete search history.

(56) References Cited

U.S. PATENT DOCUMENTS

| | | | |
|---|---|---|---|
| 6,025,059 A | 2/2000 | McGee et al. | |
| 6,495,231 B2 | 12/2002 | Benoit et al. | |
| 7,175,268 B2 | 2/2007 | Taguchi | |
| 8,012,671 B2 | 9/2011 | Kanchiku | |
| 10,526,494 B2 | 1/2020 | Regnier et al. | |
| 2004/0142122 A1 | 7/2004 | Taguchi et al. | |

(Continued)

FOREIGN PATENT DOCUMENTS

| | | |
|---|---|---|
| CN | 1417640 A | 5/2003 |
| CN | 1977297 A | 6/2007 |
| CN | 107924148 A | 4/2018 |

(Continued)

*Primary Examiner* — Lisa Solomon
(74) *Attorney, Agent, or Firm* — HP Inc. Patent Department

(57) ABSTRACT

Here is provided a method of printing on a substrate, the method comprising: providing a substrate, wherein the substrate has been primed by a primer composition comprising water, an epoxide crosslinker, polyethyleneimine and a glycol co-solvent, the primer composition having formed a primer layer on the substrate, and printing an electrostatic ink on the primer layer. A fluid set comprising the primer composition and an electrostatic ink is also described herein.

15 Claims, 1 Drawing Sheet

(56) References Cited

U.S. PATENT DOCUMENTS

2008/0271616 A1 11/2008 Pace et al.
2019/0048523 A1 2/2019 Or-Chen et al.

FOREIGN PATENT DOCUMENTS

| JP | 2001-138428 A | 5/2001 |
| JP | 2002-062678 A | 2/2002 |
| JP | 2005264052 | 9/2005 |
| WO | 2016074716 | 5/2016 |
| WO | 2017097371 | 6/2017 |
| WO | 2019/039556 A1 | 2/2019 |
| WO | 2019046740 | 3/2019 |

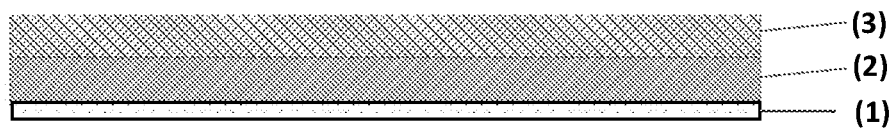

METHODS FOR PRINTING ON A SUBSTRATE AND RELATED ASPECTS

BACKGROUND

Electrostatic printing techniques can involve the formation of a latent image on a photoconductor surface mounted on an imaging plate. The latent image is developed using either a dry toner (a colorant mixed with a powder carrier) or a liquid ink (a suspension of a colorant in a liquid carrier). Liquid compositions used in liquid electrophotography are generally comprised of pigment- or dye-based thermoplastic resin particles suspended in a non-conducting liquid carrier, generally a saturated hydrocarbon. The toner or ink generally adheres to the substrate surface with little penetration into the substrate. A primer layer may be printed onto the substrate prior to printing the electrostatic ink. An overcoat layer may be printed onto the electrostatic ink.

Electrostatic inks may be printed on print substrates that comprise flexible packaging material, which may be used for packaging consumer goods, such as food products. The flexible packaging material serves to protect the product from moisture, oxidation or pathogens, while also providing information to the user regarding the nature and origin of the product contained therein.

BRIEF DESCRIPTION OF FIGURES

FIG. 1 shows an example printed substrate which is formed by the method of printing described herein.

DETAILED DESCRIPTION

Before a method of printing on a substrate; a printing apparatus for printing on a substrate; a fluid set comprising a primer composition and an electrostatic ink, a primer composition, and a printed substrate is disclosed and described, it is to be understood that this disclosure is not limited to the particular parts of the process and materials disclosed herein because the process and materials may vary somewhat. It is also to be understood that the terminology used herein is used for the purpose of describing particular examples. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise.

As used herein, "carrier liquid," "carrier," or "carrier vehicle" refers to the fluid in which the polymers, particles, colorant, charge directors and other additives can be dispersed to form an electrostatic ink or electrophotographic ink. The carrier liquids may include a mixture of a variety of different agents, such as surfactants, co-solvents, viscosity modifiers, and/or other possible ingredients.

As used herein, "electrostatic ink composition" generally refers to an ink composition in liquid form that is suitable for use in an electrostatic printing process, sometimes termed an electrophotographic printing process. The electrostatic ink composition may comprise chargeable particles of a resin, which may be as described herein, dispersed in a carrier liquid, which may be as described herein.

As used herein, "pigment" generally includes pigment colorants, magnetic particles, aluminas, silicas, and/or other ceramics or organo-metallics, whether or not such particulates impart color. Thus, though the present description primarily exemplifies the use of pigment colorants, the term "pigment" can be used more generally to describe not just pigment colorants, but other pigments such as organometallics, ferrites, ceramics, etc.

As used herein, "co-polymer" refers to a polymer that is polymerized from at least two monomers.

As used herein, "melt flow rate" generally refers to the extrusion rate of a resin through an orifice of defined dimensions at a specified temperature and load, usually reported as temperature/load, e.g. 190° C./2.16 kg. Flow rates can be used to differentiate grades or provide a measure of degradation of a material as a result of molding. In the present disclosure, "melt flow rate" is measured per ASTM D1238-04c Standard Test Method for Melt Flow Rates of Thermoplastics by Extrusion Plastometer, as referred to in the art. If a melt flow rate of a particular polymer is specified, unless otherwise stated, it is the melt flow rate for that polymer alone, in the absence of any of the other components of the electrostatic ink composition.

As used herein, "acidity," "acid number," or "acid value" refers to the mass of potassium hydroxide (KOH) in milligrams that neutralizes one gram of a substance. The acidity of a polymer can be measured according to standard techniques, for example as described in ASTM D1386. If the acidity of a particular polymer is specified, unless otherwise stated, it is the acidity for that polymer alone, in the absence of any of the other components of the liquid toner composition.

As used herein, "melt viscosity" generally refers to the ratio of shear stress to shear rate at a given shear stress or shear rate. Testing is generally performed using a capillary rheometer. A plastic charge is heated in the rheometer barrel and is forced through a die with a plunger. The plunger is pushed either by a constant force or at constant rate depending on the equipment. Measurements are taken once the system has reached steady-state operation. One method used is measuring Brookfield viscosity @ 140° C., units are mPa-s or cPoise. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate. If the melt viscosity of a particular polymer is specified, unless otherwise stated, it is the melt viscosity for that polymer alone, in the absence of any of the other components of the electrostatic ink composition.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic printing" or "electrophotographic printing" generally refers to the process that provides an image that is transferred from a photo imaging substrate either directly or indirectly via an intermediate transfer member to a print substrate, e.g. a plastic substrate. As such, the image is not substantially absorbed into the photo imaging substrate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid ink is employed in the electrophotographic process rather than a powder toner. An electrostatic printing process may involve subjecting the electrostatic ink composition to an electric field, e.g. an electric field having a field gradient of 50-400V/μm, or more, ins some examples 600-900V/μm, or more.

As used herein, "substituted" may indicate that a hydrogen atom of a compound or moiety is replaced by another atom such as a carbon atom or a heteroatom, which is part of a group referred to as a substituent. Substituents include, for example, alkyl, alkoxy, aryl, aryloxy, alkenyl, alkenoxy, alkynyl, alkynoxy, thioalkyl, thioalkenyl, thioalkynyl, thioaryl, etc.

As used herein, "heteroatom" may refer to nitrogen, oxygen, halogens, phosphorus, or sulfur.

As used herein, "alkyl", or similar expressions such as "alk" in alkaryl, may refer to a branched, unbranched, or cyclic saturated hydrocarbon group, which may, in some examples, contain from 1 to about 50 carbon atoms, or 1 to about 40 carbon atoms, or 1 to about 30 carbon atoms, or 1 to about 10 carbon atoms, or 1 to about 5 carbon atoms for example.

The term "aryl" may refer to a group containing a single aromatic ring or multiple aromatic rings that are fused together, directly linked, or indirectly linked (such that the different aromatic rings are bound to a common group such as a methylene or ethylene moiety). Aryl groups described herein may contain, but are not limited to, from 5 to about 50 carbon atoms, or 5 to about 40 carbon atoms, or 5 to 30 carbon atoms or more, and may be selected from, phenyl and naphthyl.

As used herein, the term "about" is used to provide flexibility to a numerical range endpoint by providing that a given value may be a little above or a little below the endpoint. The degree of flexibility of this term can be dictated by the particular variable and would be within the knowledge of the skilled person to determine based on experience and the associated description herein.

As used herein, wt. % values of the electrostatic ink composition are to be taken as referring to a weight-for-weight (w/w) percentage of solids in the ink composition, and may not include the weight of any carrier fluid present.

As used herein, "glycol" refers to a diol, for example, any molecule comprising two hydroxyl groups.

As used herein, "primer layer" may be used interchangeably with "primed layer". As used herein "primed substrate" may refer to the substrate with a primer layer disposed thereon.

As used herein, the word "to" in reference to the apparatus may be interpreted as "configured to".

As used herein, "corona treatment" refers to a surface modification technique that uses corona discharge plasma to increase the surface energy of the substrate.

As used herein, the terms "epoxide" and "epoxy" may be used interchangeably. An epoxide is a functional group that contains an oxygen atom attached to two adjacent carbon atoms of a hydrocarbon.

As used herein, the term "comprises" has an open meaning, which allows other, unspecified features to be present. This term embraces, but is not limited to, the semi-closed term "consisting essentially of" and the closed term "consisting of". Unless the context indicates otherwise, the term "comprises" may be replaced with either "consisting essentially of" or "consists of".

Unless otherwise stated, any feature described herein can be combined with any aspect or any other feature described herein.

In an aspect, there is provided a method of printing on a substrate, the method comprising: providing a substrate, wherein the substrate has been primed by a primer composition comprising water, an epoxide crosslinker, polyethyleneimine and a glycol co-solvent, the primer composition having formed a primer layer on the substrate; and printing an electrostatic ink on the primer layer.

In an aspect, there is provided a printing apparatus for printing on a substrate, the apparatus comprising:
a receptacle containing a primer composition comprising water, an epoxide crosslinker, polyethyleneimine and a glycol co-solvent,
a device to apply the primer composition to the substrate to form a primer layer on the substrate, and
an electrostatic printing apparatus to print an electrostatic ink on the primer layer on the substrate.

In an aspect, there is provided a fluid set comprising:
a primer composition, the primer composition comprising water, an epoxide crosslinker, polyethyleneimine and a glycol co-solvent; and
an electrostatic ink.

In an aspect, there is provided a primer composition comprising water, an epoxide crosslinker, polyethyleneimine and a glycol co-solvent.

In an aspect, there, there is provided a printed substrate, the printed substrate comprising:
a substrate with a primer layer thereon, the primer layer having been formed by priming the substrate with a primer composition comprising water, an epoxide crosslinker, polyethyleneimine and a glycol co-solvent
and an electrostatic ink having been printed thereon on the primer layer.

The method of printing on a substrate, primer composition and printing apparatus herein may provide for printed substrates with good durability, good water resistance and good chemical resistance. The primer composition described herein is found to promote adhesion between the substrate and the electrostatic ink, as well as found to promote in-primer layer cohesion. As a result, printed substrates may have a thinner primer layer compared to previous printed substrates and/or comprise less coating material. The printed substrates described herein may also be sufficiently durable for general use without an overcoat layer being applied. The water-based primer compositions described herein may have low toxicity, low flammability and low cost. The water and glycol co-solvent in the primer compositions described herein may be effectively evaporated. The methods described herein may have fewer production steps compared to previous printing methods.

Primer Composition

Epoxide Crosslinker

In some examples, the primer composition comprises an epoxide crosslinker. The epoxide crosslinker may comprise any number of epoxide groups, for example, one, two, three, four, or five or more, epoxide groups per crosslinker moiety (e.g. crosslinker molecule). In some examples, the epoxide crosslinker comprises at least two epoxide groups per crosslinker moiety (e.g. crosslinker molecule).

In some examples, the epoxide crosslinker may have a molecular weight from 100 to 600, or from 125 to 500, or from 140 to 350, or from 200 to 300. In some examples, the epoxide crosslinker comprises an internal epoxide, in other words, the epoxide crosslinker comprises an epoxide group wherein both carbons of the epoxide group are each further covalently bonded to another carbon atom, as well as being covalently bonded to the same oxygen atom as one another.

In some examples, the epoxide crosslinker comprises an epoxycycloalkyl group, that is, wherein both carbons of the epoxide group are part of a cycloalkane ring, which may be substituted. The epoxycycloalkyl group may be a cycloalkane selected from an epoxcyclopentyl, an epoxycyclohexyl, an epoxycycloheptyl or an epoxycyclooctyl, and any of these cycloalkanes may be substituted. In some examples, the epoxycycloalkyl group is an epoxycyclohexyl group. It was found that primer compositions comprising internal epoxides or epoxycyckoalkyl groups demonstrated the best adhesion with the electrostatic inks and in-primer layer better cohesion. This may be explained by the reaction kinetics of internal epoxides and epoxycycloalkyl groups, wherein crosslinking also occurs after the application of the primer composition to the substrate and/or printing of the electrostatic ink. This may be explained by internal epoxides and epoxycycloalkyl groups being more sterically hindered compared to terminal epoxides.

In some examples, the epoxide crosslinker comprises at least two epoxide groups. In some examples, the epoxide crosslinker comprises at least two internal epoxides or at least two epoxycycloalkyl groups, for example, at least two epoxycyclohexyl groups. At least two epoxy groups may lead to effective crosslinking of the polyethyleneimine and/or electrostatic ink.

In some examples, the epoxide cross-linker comprises two epoxycycloalkyl groups, which are bonded to one another via a linker group. In some examples, the linker group may be selected from a single bond, an optionally substituted alkyl, an optionally substituted aryl, optionally substituted arylalkyl, an optionally substituted alkylaryl, an isocyanurate, a polysiloxane, —O—, —C(=O)—O—CH$_2$, —O—C(=O)—CH$_2$, an amino, or combinations thereof. In some examples, the linker species may be selected from alkylene, —O—, —C(=O)—O—CH$_2$— and —O—C(=O)—CH$_2$, or combinations thereof. In some examples, the linker species may be —O—C(=O)—CH$_2$. In some examples, the cross-linker comprises two epoxycyclohexyl groups.

In some examples, the epoxide crosslinker may have the general Formula (I)

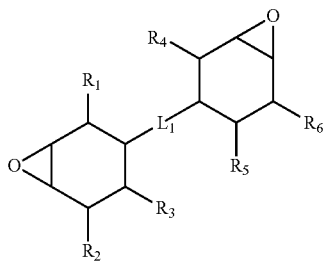

Formula (I)

wherein $R_1$, $R_2$, $R_3$, $R_4$, $R_5$ and $R_6$ are each independently selected from H, alkyl or aryl and wherein the linker $L_1$ is any suitable linker group. In some examples, the linker group $L_1$ may may be selected from a single bond, an optionally substituted alkyl, an optionally substituted aryl, optionally substituted arylalkyl, an optionally substituted alkylaryl, an isocyanurate, a polysiloxane, —O—, —C(=O)—O—CH$_2$, —O—C(=O)—CH$_2$, —CH$_2$O—(CH$_2$)—OCH$_2$— wherein n is from 2 to 10, an amino, or combinations thereof. In some examples, the linker species may be selected from alkylene, —O—, —C(=O)—O—CH$_2$— and —O—C(=O)—CH$_2$, or combinations thereof.

In some examples, the linker species $L_1$ may be —O—C(=O)—CH$_2$. In some examples, $R_1$, $R_2$, $R_3$, $R_4$, $R_5$ and $R_6$ are H.

In some examples, the epoxide cross-linker is selected from 3,4-epoxycyclohexylmethyl 3,4-epoxycyclohexanecarboxylate, 7-oxabicyclo[4.1.0]hept-3-ylmethyl 7-oxabicyclo[4.1.0]heptane-3-carboxylate) or tris(4-hydroxphenyl) methane triglycidyl ether. In some examples, the epoxide cross-linker is selected from 3,4-Epoxycyclohexylmethyl 3,4-epoxycyclohexanecarboxylate and 7-oxabicyclo[4.1.0]hept-3-ylmethyl 7-oxabicyclo[4.1.0]heptane-3-carboxylate, in some examples, 7-oxabicyclo[4.1.0]hept-3-ylmethyl 7-oxabicyclo[4.1.0]heptane-3-carboxylate.

In some examples, the epoxide crosslinker has the general Formula (II)

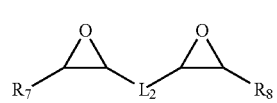

Formula (II)

wherein $L_2$ is a linker group and wherein $R_7$ and $R_8$ are each independently selected from H or alkyl. The linker $L_2$ may be any suitable linker group, for example, $L_2$ may be selected from a single bond, an optionally substituted alkyl, an optionally substituted aryl, optionally substituted arylalkyl, an optionally substituted alkylaryl, an isocyanurate, a polysiloxane, —O—, —C(=O)—O—CH$_2$, —O—C(=O)—CH$_2$, an amino, —CH$_2$O—(CH$_2$)$_n$—OCH$_2$— wherein n is 2 to 10, or combinations thereof. In some examples, the linker group $L_2$ has the formula —CH$_2$O—(CH$_2$)$_n$—OCH$_2$— wherein n is from 2 to 10, in some examples, from 2 to 6. In some examples, $R_7$ and $R_8$ are both hydrogen.

In some examples, the epoxide crosslinker may be selected from:

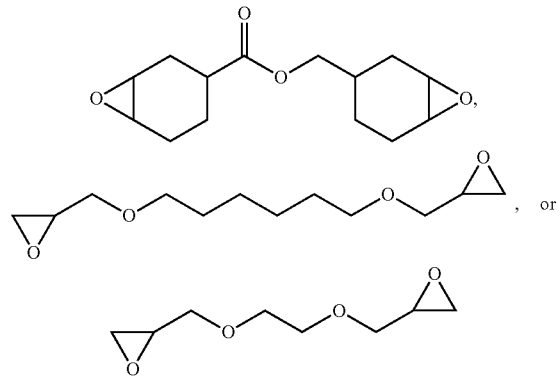

In some examples, the primer composition comprises the epoxide crosslinker in an amount from 0.1 wt. % to 15 wt. %, or from 0.15 wt. % to 10 wt. %, or from 0.2 wt. % to 7.5 wt. %, or from 0.3 wt. % to 6 wt. % by weight of the total primer composition. In some examples, the primer composition comprises the epoxide crosslinker in an amount greater than 0.1 wt. %, or greater than 0.2 wt. %, or greater than 0.3 wt. %, or greater than 0.4 wt. %, or greater than 0.5 wt. %, or greater than 0.6 wt. %, or greater than 0.7 wt. %, or greater than 0.8 wt. %, or greater than 0.9 wt. %, or greater than 1 wt. %, or greater than 1.1 wt. %, or greater than 1.5 wt. % by weight of the total primer composition. In some examples, the primer composition comprises the epoxide crosslinker in an amount less than 10 wt. %, or less than 7.5 wt. %, or less than 6 wt. %, or less than 3 wt. %, or less than 1 wt. % by weight of the total primer composition.

In some examples, the epoxide crosslinker crosslinks polyethyleneimine, for example, to form crosslinked polyethyleneimine. In some examples, after printing the electrostatic ink on the primer layer, the epoxide crosslinker crosslinks the electrostatic ink. In some examples, e.g. if the electrostatic ink and/or polyethyleneimine has groups, such as hydroxyl groups or acidic groups or amine groups, that can react with the epoxide groups, after printing the electrostatic ink on the primer layer, the epoxide crosslinker crosslinks the electrostatic ink and/or polyethyleneimine.

In some examples, the electrostatic ink comprises a thermoplastic resin, for example, wherein the thermoplastic resin, wherein the thermoplastic resin may comprise a polymer comprising acidic side groups. In some examples, the epoxide crosslinker crosslinks the thermoplastic resin, for example, wherein the thermoplastic resin comprises a polymer comprising acidic side groups. In some examples, after printing the electrostatic ink on the primer layer, the epoxy crosslinker crosslinks the thermoplastic resin and/or polyethyleneimine, in some examples, wherein the thermoplastic resin comprises a polymer having acidic side groups.

In some examples, the epoxide crosslinker may be used to promote ink adhesion of the electrostatic ink to the primer layer. In some examples, the epoxide crosslinker may be used to improve the durability of the printed substrate. In some examples, the epoxide crosslinker may be used to increase water and chemical resistance of the printed substrate.

In some examples, the epoxy crosslinker used is Indigot S105 from Lambson.

Polyethyleneimine

Polyethyleneimine is any homopolymer formed from $NH_2—CH_2—CH_2—NH_2$ monomers. The polyethyleneimine may be branched or unbranched. The polyethyleneimine may comprise primary, secondary and tertiary amino groups.

In some examples, the polyethyleneimine may have a number average molecular weight from 100 to 50000, or from 300 to 40000, or from 400 to 35000, or from 500 to 32250, or from 10000 to 30000, or from 22000 to 27000. In some examples, the polyethyleneimine has a number average molecular weight greater than 500, or 600, or 700, or 1000, or 5000, or 10000, or 20000. In some examples, the polyethyleneimine may have a number average molecular weight lower than 50000, or 40000 or 30000. In some examples, the number average molecular weight of the polyethyleneimine may have been determined by gas phase chromatography (GPC).

In some examples, the polyethyleneimine has a pH value of from 9 to 13, or from 9.5 to 12.5, or from 10 to 12, or from 10.5 to 12, or from 11.0 to 12.0.

In some examples, the polyethyleneimine has a density of from 0.60 $g/cm^3$ to 1.60 $g/cm^3$, or from 0.80 $g/cm^3$ to 1.40 $g/cm^3$, or from 0.9 $g/cm^3$ to 1.30 $g/cm^3$, or from 1 $g/cm^3$ to 1.2 $g/cm^3$. In some examples, the polyethyleneimine has a density of greater than 0.6 $g/cm^3$, or 0.7 $g/cm^3$, or 0.8 $g/cm^3$, 0.9 $g/cm^3$, or 1.0 $g/cm^3$, or 1.05 $g/cm^3$. In some examples, the polyethyleneimine has a density of less than 1.60 $g/cm^3$, or 1.50 $g/cm^3$, or 1.40 $g/cm^3$, or 1.30 $g/cm^3$, or 1.20 $g/cm^3$, or 1.10 $g/cm^3$. In some examples, the polyethyleneimine has a density of about 1.10 $g/cm^3$. In some examples, the density of polyethyleneimine is determined at 20° C. in accordance with ISO 51757.

In some examples, the polyethyleneimine has a viscosity of from 10 MPa·s to 50 MPa·s, or from 15 MPa·s to 45 mPa·s, or from 20 MPa·s to 30 MPa·s, or about 25 MPa·s. In some examples, the polyethyleneimine has as viscosity of greater than 10 MPa·s, or greater than 15 MPa·s, or greater than 20 MPa·s. In some examples, the polyethyleneimine has a viscosity less than 50 MPa·s, or less than 40 MPa·s, or less than 30 MPa·s. In some examples, viscosity is determined at 25° C. in accordance with ISO 2555.

In some examples, the primer composition comprises the polyethyleneimine in an amount from 0.25 wt. % to 15 wt. %, or from 0.4 wt. % to 12 wt. %, or from 0.75 wt. % to 10 wt. %, or from 1 wt. % to 8 wt. % by weight of the total primer composition. In some examples, the primer composition comprises the polyethyleneimine in an amount greater than 0.25 wt. %, or greater than 0.5 wt. %, or greater than 0.75 wt. %, or greater than 1 wt. %, or greater than 2 wt. %, or greater than 3 wt. %, or greater than 4 wt. % of the total primer composition. In some examples, the primer composition comprises the polyethyleneimine in an amount less than 15 wt. %, or less than 10 wt. %, or less than 8 wt. %, or less than 6 wt. %, or less than 4 wt. %, or less than 3 wt. %, or less than 2 wt. %, or less than 1.5 wt. % of the total primer composition.

In some examples, the primer composition and/or primer layer comprises the polyethyleneimine and epoxide crosslinker in a ratio of 25:1 to 1:5 by weight, or a ratio of 5:1 to 1:5 by weight, ora ratio of 2:1 to 1:3 by weight, ora ratio of 2:1 to 1:2 by weight, ora ratio of from 1:1 to 1:2 by weight. In some examples, the primer composition and/or primer layer comprises the polyethyleneimine and epoxide crosslinker in a ratio of less than 25:1 by weight, or a ratio of less than 10:1 by weight, or a ratio of less than 5:1 by weight, or a ratio of less than 2:1 by weight.

In some examples, the polyethyleneimine used is Loxanol® MI6730 or Lupasol® WF from BASF.

Water

The primer composition comprises water. In some examples, the primer composition may comprise water in an amount from 5 wt. % to 95 wt. %, or from 10 wt. % to 75 wt. %, or from 20 wt. % to 65 wt. %, or from 30 wt. % to 60 wt. %, or from 40 wt. % to 55 wt. %. In some examples, the primer composition may comprise water in an amount of at least 10 wt. %, or at least 20 wt. %, or at least 30 wt. %, or at least 40 wt. % water, or at least 45 wt. % water. In some examples, the primer composition may comprise water in an amount less than 90 wt. %, or less than 80 wt. %, or less than 70 wt. %, or less than 60 wt. %.

Glycol Co-Solvent

The primer composition comprises a glycol co-solvent. A glycol co-solvent may be a diol, which may be an aliphatic diol. The glycol co-solvent may be any solvent that is miscible with water.

In some examples, the glycol co-solvent may have a boiling point of less than 250° C., or less than 225° C., or less than 200° C., or less than 190° C.

In some examples, the glycol co-solvent has a flash point of greater than 60° C., or greater than 75° C., or greater than 85° C., or greater than 95° C., or greater than 100° C.

In some examples, the glycol co-solvent may be selected from propylene glycol, 1,2-butanediol, 1,3-butanediol, 1,4-butanediol, 2-butoxyethanol, ethylene glycol, 1,3-propanediol and 1,5-propanediol. In some examples, the co-solvent is propylene glycol.

In some examples, the primer composition may comprise the glycol co-solvent in an amount from 5 wt. % to 95 wt. %, or from 25 wt. % to 70 wt. %, or from 40 wt. % to 60 wt. %, or from 40 wt. % to 55 wt. %. In some examples, the primer composition may comprise the glycol co-solvent in an amount of at least 30 wt. % of the total primer composition, or at least 35 wt. %, or at least 40 wt. % of the total primer composition. In some examples, the primer composition may comprise propylene glycol in an amount of at least 30 wt. % of the total primer composition, or at least 35 wt. % of the total primer composition.

In some examples, the primer composition may comprise water and the glycol co-solvent in a ratio of 4:1 to 1:4 by weight, or from 3:1 to 1:3 by weight, or from 2:1 to 1:2 by weight, or from 1.5:1 to 1:1.5 by weight.

In some examples, the primer composition comprises:
1 wt. % to 8 wt. % polyethyleneimine
0.3 wt. % to 6 wt. % epoxide crosslinker,
at least 40 wt. % glycol co-solvent,
and a balance of water.

In an example, the epoxide crosslinker comprises at least two epoxycyclohexyl groups and the glycol co-solvent is propylene glycol. In an example, the epoxide crosslinker is 7-oxabicyclo[4.1.0]hept-3-ylmethyl 7-oxabicyclo[4.1.0]heptane-3-carboxylate and the co-solvent is propylene glycol.

In some examples, the primer composition comprises:
2 wt. % to 3 wt. % polyethyleneimine
2 wt. % to 5.5 wt. % epoxide crosslinker,
at least 40 wt. % co-solvent,
and a balance of water.

In an example, the epoxide crosslinker comprises at least two epoxycyclohexyl groups and the glycol co-solvent is propylene glycol. In an example, the epoxide crosslinker is 7-oxabicyclo[4.1.0]hept-3-ylmethyl 7-oxabicyclo[4.1.0]heptane-3-carboxylate and the co-solvent is propylene glycol.

Printing on a Substrate

In some examples, there is provided a method of printing on a substrate, the method comprising:
providing a substrate, wherein the substrate has been primed by a primer composition comprising water, an epoxide crosslinker, polyethyleneimine and a glycol co-solvent, the primer composition having formed a primer layer on the substrate, and
printing an electrostatic ink on the primer layer. In some examples, the electrostatic ink is a liquid electrostatic ink.

Substrate

The method of printing on a substrate may use any printing apparatus, for example, the printing apparatus described herein.

The substrate may be any suitable substrate capable of having an image printed thereon. The substrate may include a material selected from an organic or inorganic material. The material may include a natural polymeric material, e.g. cellulose. In an example, the substrate includes a cellulosic paper. In an example, the cellulosic paper is coated with a polymeric material, e.g. a polymer formed from styrene-butadiene resin. In some examples, the cellulosic paper has an inorganic material bound to its surface (before printing with ink) with a polymeric material, wherein the inorganic material may be selected from, for example, kaolinite or calcium carbonate. The substrate is, in some examples, a cellulosic print substrate such as paper. The cellulosic print substrate is, in some examples, a coated cellulosic print. In some examples, the substrate is a metal, for example, aluminium, such as aluminium foil. In some examples, the substrate is a lid, label or shrink sleeve material.

In some examples, the substrate comprises a polymer. The polymer may be formed from alkylene monomers. In some examples, the substrate is flexible packaging material. In some examples, the substrate is a plastic film. In some examples, the substrate comprises a film of biaxially orientated polyethylene, biaxially oriented polypropylene (BOPP), polyethylene terephthalate (PET) or oriented polyamide (OPA). In some examples, the substrate is biaxially orientated polypropylene (BOPP) or polyethylene terephthalate (PET). In some examples, the polymer comprises film which is less than 100 μm in thickness, for example less than 90 μm in thickness, less than 80 μm in thickness, less than 70 μm in thickness, less than 60 μm in thickness, less than 50 μm in thickness, less than 40 μm in thickness, less than 30 μm in thickness, less than 20 μm in thickness, less than 15 μm in thickness. In some examples, the film of polymer is about 12 μm in thickness. In some examples, the substrate is a flexible substrate, or any substrate that may be suitable for flexible packaging material. In some examples, the substrate is transparent.

Primer Layer

The primer layer may be formed by priming the substrate with a primer composition comprising water, an epoxide crosslinker, polyethyleneimine and a glycol co-solvent. The primer layer may be formed by coating the substrate with a primer composition comprising water, an epoxide crosslinker, polyethyleneimine and a glycol co-solvent, and, in some examples, removing at least some of the water and/or the glycol co-solvent from the composition. The primer composition used may be any primer composition described herein.

In some examples, the primer layer comprises crosslinked polyethyleneimine. In some examples, the primer layer comprises polyethyleneimine and an epoxide crosslinker. In some examples, the primer layer comprises epoxide crosslinker, polyethyleneimine and crosslinked polyethyleneimine.

In some examples, the primer layer may have a dry coat weight of from 0.01 g/m$^2$ to 0.5 g/m$^2$, or from 0.04 g/m$^2$ to 0.2 g/m$^2$, or from 0.05 g/m$^2$ to 0.175 g/m$^2$, or from 0.1 g/m$^2$ to 0.15 g/m$^2$. In some examples, the primer layer may have a dry coat weight of less than 0.5 g/m$^2$, or less than 0.4 g/m$^2$, or less than 0.3 g/m$^2$, or less than 0.2 g/m$^2$, or less than 0.15 g/m$^2$.

In some examples, the primer composition comprises less than 10% non-volatile solids, or less than 7% non-volatile solids, or less than 5% non-volatile solids.

In some examples the primer layer may comprise a reduced amount of water and/or co-solvent compared with the primer composition before coating the substrate and/or printing. In some examples the primer layer may be substantially free from water and/or co-solvent. Substantially free from water may indicate that the primer layer contains less than 5 wt % water and/or co-solvent, in some examples, less than 2 wt % water and/or co-solvent, in some examples less than 1 wt % water and/or co-solvent, in some examples less than 0.5 wt % water and/or co-solvent, in some examples less than 0.1 wt % water and/or co-solvent.

In some examples, the substrate may have been primed by any suitable method. In some examples, the method includes forming the primer layer on the substrate by applying the primer composition to the substrate. In some examples, the electrostatic ink is a liquid electrostatic ink.

In some examples, the substrate may have been primed (i.e. applying the primer composition to the substrate) by coating the substrate with a primer composition using any suitable analogue printing technique. The term 'analogue printing' is used herein to refer to methods of coating a print substrate, or coating systems for coating a substrate, using a non-digital technique. For example, coating a surface of a print substrate with the primer composition using an analogue printing technique may comprise flood coating a surface of the substrate with the primer composition, for example coating part, or all, of a surface of the substrate in a non-selective manner. In some examples, coating a surface of the substrate using an analogue printing technique may comprise selectively applying the primer composition to the substrate. In some examples, the substrate may have been primed by coating the substrate with a primer composition using rod-coating, gravure coating, roll coating, flexographic printing, lithography, spray coating, screen printing. In some examples, the substrate may have been primed by coating the substrate with a primer composition using gravure coating.

In some examples, before priming, the substrate may be subjected to corona treatment. In some examples, the corona treatment has an intensity from 500 W to 2000 W, or from 550 W to 1000 W or from 600 W to 800 W, or about 700 W. Substrate corona treatment may promote adhesion of primer to the substrate.

In some examples, the priming comprises coating the substrate with a primer composition at a coating speed of from 5 m/min to 20 m/min, in some examples, from 10 m/min to 15 m/min. In some examples, the priming comprises coating the substrate with a primer composition at a coating speed of less than 25 m/min, or less than 20 m/min, or less than 15 m/min.

In some examples, the method further comprises heating the primer composition and/or primer layer. In some examples, the primer composition and/or primer layer may be heated to a temperature of at least 50° C., or at least 60° C., or at least 70° C., or at least 80° C., or at least 90° C., or at least 95° C., or at least 100° C., or at least 120° C. In some examples, the primer composition may have been heated to a temperature of from 50° C. to 130° C., or from 70° C. to 125° C., or from 95° C. to 125° C., or from 100° C. to 120° C. In some examples, the heating may cause the water and/or glycol co-solvent to evaporate. In some examples, the heating may cause the epoxide crosslinker to crosslink at least a portion of the polyethyleneimine, for example, to form crosslinked polyethyleneimine.

Printing

The electrostatic ink may be printed onto the primer layer using any suitable method, for example, liquid electrostatic printing (LEP). In some examples, the printing comprises: providing an electrostatic ink, forming a latent image on a surface, contacting the surface with the electrostatic ink such that a developed toner image is formed on the surface, and transferring the toner image to the primer layer.

In some examples, the electrostatic ink printed on the primer layer of the substrate may comprise a thermoplastic resin. In some examples, the thermoplastic resin may comprise a polymer having acidic side groups.

In some examples, printing the electrostatic ink on the primer layer leads to crosslinking of the electrostatic ink, for example, crosslinking of the thermoplastic resin, wherein the thermoplastic resin may comprise a polymer having acidic groups, for example, carboxylic side groups. In some examples, printing the electrostatic ink on the primer layer leads to crosslinking of the electrostatic ink with the primer layer, for example, crosslinking of the thermoplastic resin and the polyethyleneimine and/or the epoxy crosslinker, in some examples, wherein the thermoplastic resin comprises a polymer having acidic side groups, for example, carboxylic side groups. In some examples, printing the electrostatic ink leads to crosslinking of the electrostatic ink with the primer layer.

In some examples, the method further comprises heating the substrate, after printing the electrostatic ink on the primer layer. In some examples, the substrate may be heated to a temperature of at least 50° C., or at least 60° C., or at least 70° C., or to about 75° C. In some examples, the primer composition may have been heated to a temperature of from 50° C. to 90° C., or from 70° C. to 85° C., or from about 70° C. to 80° C. In some examples, the substrate may be heated for at least 18 hours, or at least 20 hours, or at least 24 hours. In some examples, the substrate may be heated for 18 to 24 hours, for example, to a temperature of from 50° C. to 90° C., or from 70° C. to 85° C., or from 70° C. to 80° C.

In some examples, there is no further coating treatment of the printed substrate after printing the electrostatic ink on the primer layer.

Electrostatic Ink

Each of these components of an electrostatic ink, which may be the ink composition printed on the primer layer of the substrate, or the electrostatic ink in the fluid set, will be described separately in the sub-sections which follow. In some examples, the electrostatic ink is a liquid electrostatic ink.

In some examples, the electrostatic ink printed on the primer layer of the substrate may comprise a thermoplastic resin, in some examples, a thermoplastic resin comprising a polymer having acidic side groups.

In some examples, the electrostatic ink may comprise a thermoplastic resin, in some examples, a thermoplastic resin comprising a polymer having acidic side groups, and a colorant or pigment. An electrostatic ink composition may comprise a colorant or pigment, a thermoplastic resin and a carrier fluid or liquid. The electrostatic ink composition may further comprise an additive such as a charge director, charge adjuvant, surfactant, viscosity modifier, emulsifier and the like. In some examples, the electrostatic ink composition may not contain any pigment, or comprise substantially zero pigment and thus be a pigment-free composition, useful in providing a particular transparent gloss or sheen to a printed substrate.

In some examples, the electrostatic ink composition, after printing, may comprise a reduced amount of carrier liquid compared with the electrostatic ink printing composition before printing. In some examples, an electrostatic ink composition, which may be printed on the primer layer of the substrate, may be substantially free from carrier liquid. Substantially free from carrier liquid may indicate that the ink printed on the primer layer of the substrate contains less than 5 wt % carrier liquid, in some examples, less than 2 wt % carrier liquid, in some examples less than 1 wt % carrier liquid, in some examples less than 0.5 wt % carrier liquid. In some examples, an electrostatic ink composition that may be printed on the primer layer of the substrate is free from carrier liquid.

Colorant

An electrostatic ink composition may comprise a colorant. The colorant may be a dye or pigment. The colorant can be any colorant compatible with the liquid carrier and useful for electrophotographic printing. For example, the colorant may be present as pigment particles, or may comprise a resin (in addition to the polymers described herein) and a pigment. In some examples, the colorant is selected from a cyan pigment, a magenta pigment, a yellow pigment and a black pigment. For example, pigments by Hoechst including Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Hansa Yellow X, NOVAPERM® YELLOW HR, NOVAPERM® YELLOW FGL, Hansa Brilliant Yellow 10GX, Permanent Yellow G3R-01, HOSTAPERM® YELLOW H4G, HOSTAPERM® YELLOW H3G, HOSTAPERM® ORANGE GR, HOSTAPERM® SCARLET GO, Permanent Rubine F6B; pigments by Sun Chemical including L74-1357 Yellow, L75-1331 Yellow, L75-2337 Yellow; pigments by Heubach including DALAMAR® YELLOW YT-858-D; pigments by Ciba-Geigy including CROMOPHTHAL® YELLOW 3 G, CROMOPHTHAL® YELLOW GR, CROMOPHTHAL® YELLOW 8 G, IRGAZINE® YELLOW SGT, IRGALITE® RUBINE 4BL, MONASTRAL® MAGENTA, MONASTRAL® SCARLET, MONASTRAL® VIOLET, MONASTRAL® RED, MONASTRAL® VIOLET; pigments by BASF including LUMOGEN® LIGHT YELLOW, PALIOGEN® ORANGE, HELIOGEN® BLUE L 690 IF, HELIOGEN® BLUE TBD 7010, HELIOGEN® BLUE K 7090, HELIOGEN® BLUE L 710 IF, HELIOGEN® BLUE L 6470, HELIOGEN® GREEN K 8683, HELIOGEN® GREEN L 9140; pigments by Mobay including QUINDO® MAGENTA, INDOFAST® BRILLIANT SCARLET, QUINDO® RED 6700, QUINDO® RED 6713, INDOFAST® VIOLET; pigments by Cabot including Maroon B STERLING® NS BLACK, STERLING® NSX 76, MOGUL® L; pigments by DuPont including TIPURE® R-101; and pigments by Paul Uhlich including UHLICH® BK 8200. Where the pigment is a white pigment particle, the pigment particle may be selected from the group consisting of $TiO_2$, calcium carbonate, zinc oxide, and mixtures thereof. In some examples the white pigment particle may comprise an alumina-$TiO_2$ pigment.

In some examples, the colorant or pigment particles may have a median particle size or $d_{50}$ of less than 20 µm, for example less than 15 µm, for example less than 10 µm, for example less than 5 µm, for example less than 4 µm, for example less than 3 µm, for example less than 2 µm, for example less than 1 µm, for example less than 0.9 µm, for example less than 08 µm, for example less than 0.7 µm, for example less than 0.6 µm, for example less than 0.5 µm. Unless otherwise stated, the particle size of the colorant or pigment particle and the resin coated pigment particle is determined using laser diffraction on a Malvern Mastersizer 2000 according to the standard procedure as described in the operating manual.

The colorant or pigment particle may be present in an electrostatic ink composition in an amount of from 10 wt % to 80 wt % of the total amount of resin and pigment, in some examples 15 wt % to 80 wt %, in some examples 15 wt % to 60 wt %, in some examples 15 wt % to 50 wt %, in some examples 15 wt % to 40 wt %, in some examples 15 wt % to 30 wt % of the total amount of resin and colorant. In some examples, the colorant or pigment particle may be present in an electrostatic ink composition in an amount of at least 50 wt % of the total amount of resin and colorant or pigment, for example at least 55 wt % of the total amount of resin and colorant or pigment.

Polymer Resin

In some examples, the ink composition is an electrostatic ink composition comprising a polymer resin as the thermoplastic resin. In some examples, the electrostatic ink composition comprises a polymer resin comprising a polymer having acidic side groups. In some examples, an electrostatic ink composition comprises a polymer resin comprising a copolymer of an alkylene monomer and a monomer selected from acrylic acid and methacrylic acid.

The polymer resin or thermoplastic resin may be referred to as a thermoplastic polymer. In some examples, the polymer resin may comprise ethylene or propylene acrylic acid co-polymers; ethylene or propylene methacrylic acid co-polymers; ethylene vinyl acetate co-polymers; co-polymers of ethylene or propylene (e.g. 80 wt % to 99.9 wt %), and alkyl (e.g. C1 to C5) ester of methacrylic or acrylic acid (e.g. 0.1 wt % to 20 wt %); co-polymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); co-polymers of ethylene or propylene (e.g. 70 wt % to 99.9 wt %) and maleic anhydride (e.g. 0.1 wt % to 30 wt %); polyethylene; polystyrene; isotactic polypropylene (crystalline); co-polymers of ethylene ethylene ethyl acrylate; polyesters; polyvinyl toluene; polyamides; styrene/butadiene co-polymers; epoxy resins; acrylic resins (e.g. co-polymer of acrylic or methacrylic acid and at least one alkyl ester of acrylic or methacrylic acid wherein alkyl may have from 1 to about 20 carbon atoms, such as methyl methacrylate (e.g. 50% to 90%)/methacrylic acid (e.g. 0 wt % to 20 wt %)/ethylhexylacrylate (e.g. 10 wt % to 50 wt %)); ethylene-acrylate terpolymers: ethylene-acrylic esters-maleic anhydride (MAH) or glycidyl methacrylate (GMA) terpolymers; ethylene-acrylic acid ionomers or combinations thereof.

The polymer resin may comprise a polymer having acidic side groups. Examples of the polymer having acidic side groups will now be described. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g can be measured using standard procedures, for example using the procedure described in ASTM D1386.

The polymer resin may comprise a polymer having acidic side groups, that has a melt flow rate of less than about 70 g/10 minutes, in some examples about 60 g/10 minutes or less, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of, in some examples, about 50 g/10 minutes to about 120 g/10 minutes, in some examples 60 g/10 minutes to about 100 g/10 minutes. The melt flow rate can be measured using standard procedures, for example as described in ASTM D1238.

The acidic side groups may be in free acid form or may be in the form of an anion and associated with a counterion, generally metal counterions, e.g. a metal selected from the alkali metals, such as lithium, sodium and potassium, alkali earth metals, such as magnesium or calcium, and transition metals, such as zinc. The polymer having acidic sides groups can be selected from resins such as co-polymers of ethylene and an ethylenically unsaturated acid of either acrylic acid or methacrylic acid; and ionomers thereof, such as methacrylic acid and ethylene-acrylic or methacrylic acid co-polymers which are at least partially neutralized with metal ions (e.g. Zn, Na, Li) such as SURLYN ionomers. The polymer comprising acidic side groups can be a co-polymer of ethylene and an ethylenically unsaturated acid of either acrylic or methacrylic acid, where the ethylenically unsaturated acid of either acrylic or methacrylic acid constitute from 5 wt % to about 25 wt % of the co-polymer, in some examples from 10 wt % to about 20 wt % of the co-polymer.

The polymer resin may comprise two different polymers having acidic side groups. The two polymers having acidic side groups may have different acidities, which may fall within the ranges mentioned above. The polymer resin may comprise a first polymer having acidic side groups that has an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has an acidity of 110 mg KOH/g to 130 mg KOH/g.

The polymer resin may comprise two different polymers having acidic side groups: a first polymer having acidic side groups that has a melt flow rate of about 10 g/10 minutes to about 50 g/10 minutes and an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The ratio of the first polymer having acidic side groups to the second polymer having acidic side groups can be from about 10:1 to about 2:1. The ratio can be from about 6:1 to about 3:1, in some examples about 4:1.

The polymer resin may comprise a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein. The polymer resin may comprise a first polymer having a melt viscosity of 15000 poise or more, in some examples 20000 poise or more, in some examples 50000 poise or more, in some examples 70000 poise or more; and in some examples, the polymer resin may comprise a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The polymer resin may comprise a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is Nucrel 960 (from DuPont), and example of the second polymer is Nucrel 699 (from DuPont), and an example of the third polymer is AC-5120 or AC-5180 (from Honeywell). The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

If the polymer resin comprises a single type of polymer, the polymer (excluding any other components of the electrophotographic ink composition) may have a melt viscosity of 6000 poise or more, in some examples a melt viscosity of 8000 poise or more, in some examples a melt viscosity of 10000 poise or more, in some examples a melt viscosity of 12000 poise or more. If the polymer resin comprises a plurality of polymers all the polymers of the polymer resin may together form a mixture (excluding any other components of the electrophotographic ink composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

The polymer resin may comprise two different polymers having acidic side groups that are selected from co-polymers of ethylene and an ethylenically unsaturated acid of either acrylic acid or methacrylic acid; or ionomers thereof, such as methacrylic acid and ethylene-acrylic or methacrylic acid co-polymers which are at least partially neutralized with metal ions (e.g. Zn, Na, Li) such as SURLYN ionomers. The polymer resin may comprise (i) a first polymer that is a co-polymer of ethylene and an ethylenically unsaturated acid of either acrylic acid and methacrylic acid, wherein the ethylenically unsaturated acid of either acrylic or methacrylic acid constitutes from 8 wt % to about 16 wt % of the co-polymer, in some examples 10 wt % to 16 wt % of the co-polymer; and (ii) a second polymer that is a co-polymer of ethylene and an ethylenically unsaturated acid of either acrylic acid and methacrylic acid, wherein the ethylenically unsaturated acid of either acrylic or methacrylic acid constitutes from 12 wt % to about 30 wt % of the co-polymer, in some examples from 14 wt % to about 20 wt % of the co-polymer, in some examples from 16 wt % to about 20 wt % of the co-polymer in some examples from 17 wt % to 19 wt % of the co-polymer.

The polymer resin may comprise a polymer having acidic side groups, as described above (which may be free of ester side groups), and a polymer having ester side groups. The polymer having ester side groups may be a thermoplastic polymer. The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, for example, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1% to 50% by weight of the co-polymer, in some examples 5% to 40% by weight, in some examples 5% to 20% by weight of the co-polymer, in some examples 5% to 15% by weight of the co-polymer. The second monomer may constitute 1% to 50% by weight of the co-polymer, in some examples 5% to 40% by weight of the co-polymer, in some examples 5% to 20% by weight of the co-polymer, in some examples 5% to 15% by weight of the co-polymer. The first monomer can constitute 5% to 40% by weight of the co-polymer, the second monomer constitutes 5% to 40% by weight of the co-polymer, and with the third monomer constituting the remaining weight of the co-polymer. In some examples, the first monomer constitutes 5% to 15% by weight of the co-polymer, the second monomer constitutes 5% to 15% by weight of the co-polymer, with the third monomer constituting the remaining weight of the co-polymer. In some examples, the first monomer constitutes 8% to 12% by weight of the co-polymer, the second monomer constitutes 8% to 12% by weight of the co-polymer, with the third monomer constituting the remaining weight of the co-polymer. In some examples, the first monomer constitutes about 10% by weight of the co-polymer, the second monomer constitutes about 10% by weight of the co-polymer, and with the third monomer constituting the remaining weight of the co-polymer. The polymer may be selected from the Bynel® class of monomer, including Bynel 2022 and Bynel 2002, which are available from DuPont®.

The polymer having ester side groups may constitute 1% or more by weight of the total amount of the resin polymers, e.g. thermoplastic resin polymers, in the liquid electrophotographic ink composition and/or the ink printed on the primer layer of the substrate, e.g. the total amount of the polymer or polymers having acidic side groups and polymer having ester side groups. The polymer having ester side groups may constitute 5% or more by weight of the total amount of the resin polymers, e.g. thermoplastic resin polymers, in some examples 8% or more by weight of the total amount of the resin polymers, e.g. thermoplastic resin polymers, in some examples 10% or more by weight of the total amount of the resin polymers, e.g. thermoplastic resin polymers, in some examples 15% or more by weight of the total amount of the resin polymers, e.g. thermoplastic resin polymers, in some examples 20% or more by weight of the total amount of the resin polymers, e.g. thermoplastic resin polymers, in some examples 25% or more by weight of the total amount of the resin polymers, e.g. thermoplastic resin polymers, in some examples 30% or more by weight of the total amount of the resin polymers, e.g. thermoplastic resin polymers, in some examples 35% or more by weight of the total amount of the resin polymers, e.g. thermoplastic resin polymers, in the liquid electrophotographic composition and/or the ink printed on the primer layer of the substrate. The polymer having ester side groups may constitute from 5% to 50% by weight of the total amount of the resin polymers, e.g. thermoplastic resin polymers, in the liquid electrophotographic composition and/or the ink printed on the primer layer of the substrate, in some examples 10% to 40% by weight of the total amount of the resin polymers, e.g. thermoplastic resin polymers, in the liquid electrophotographic composition and/or the ink composition printed on the primer layer of the substrate, in some examples 5% to 30% by weight of the total amount of the resin polymers, e.g. thermoplastic resin polymers, in the liquid electrophotographic composition and/or the ink composition printed on the primer layer of the substrate, in some examples 5% to 15% by weight of the total amount of the resin polymers, e.g. thermoplastic resin polymers, in the liquid electrophotographic composition and/or the ink composition printed on the primer layer of the substrate in some examples 15% to 30% by weight of the total amount of the resin polymers, e.g. thermoplastic resin polymers, in the liquid electrophotographic composition and/or the ink composition printed on the primer layer of the substrate.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

The polymer, polymers, co-polymer or co-polymers of the thermoplastic resin can in some examples be selected from the Nucrel family of toners (e.g. Nucrel 403™, Nucrel 407™, Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX76™, Nucrel 2806™, Bynell 2002, Bynell 2014, Bynell 2020 and Bynell 2022, (sold by E. I. du PONT)), the AC family of toners (e.g. AC-5120, AC-5180, AC-540, AC-580 (sold by Honeywell)), the Aclyn family of toners (e.g. Aclyn 201, Aclyn 246, Aclyn 285, and Aclyn 295), and the Lotader family of toners (e.g. Lotader 2210, Lotader, 3430, and Lotader 8200 (sold by Arkema)).

The polymer resin can constitute about 5 to 90%, in some examples about 50 to 80%, by weight of the solids of the liquid electrophotographic composition and/or the ink composition printed on the primer layer of the substrate. The resin can constitute about 60 to 95%, in some examples about 70 to 95%, by weight of the solids of the liquid electrophotographic composition and/or the ink composition printed on the primer layer of the substrate.

Carrier Liquid

In some examples, an electrostatic ink composition described herein comprises polymer resin coated pigment particles, or polymer resin particles, which are formed in and/or dispersed in a carrier fluid or carrier liquid. Before application to the substrate in a printing process, e.g. an electrostatic printing process, the ink composition may be an electrostatic ink composition, which may be in dry form, for example in the form of flowable pigment particles coated with the thermoplastic resin. In some examples, before application to the primer layer of the substrate in an electrostatic printing process, an electrostatic ink composition may be in liquid form; and may comprise a carrier liquid in which is suspended pigment particles coated with the thermoplastic resin.

Generally, the carrier liquid acts as a reaction solvent in preparing the coated pigment particles, and can also act as a dispersing medium for the other components in the resulting electrostatic ink composition. In some examples, the carrier liquid is a liquid which does not dissolve the polymer resin at room temperature. In some examples, the carrier liquid is a liquid which dissolves the polymer resin at elevated temperatures. For example, the polymer resin may be soluble in the carrier liquid when heated to a temperature of at least 80° C., for example 90° C., for example 100° C., for example 110° C., for example 120° C. For example, the carrier liquid can comprise or be a hydrocarbon, silicone oil, vegetable oil, etc. The carrier liquid can include, an insulating, non-polar, non-aqueous liquid that can be used as a medium for toner particles. The carrier liquid can include compounds that have a resistivity in excess of about $10^9$ ohm-cm. The carrier liquid may have a dielectric constant below about 5, in some examples below about 3. The carrier liquid can include hydrocarbons. The hydrocarbon can include an aliphatic hydrocarbon, an isomerized aliphatic hydrocarbon, branched chain aliphatic hydrocarbons, aromatic hydrocarbons, and combinations thereof. Examples of the carrier liquids include aliphatic hydrocarbons, isoparaffinic compounds, paraffinic compounds, dearomatized hydrocarbon compounds, and the like. In particular, the carrier liquids can include Isopar-G™, Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™).

Before printing, the carrier liquid can constitute about 20% to 99.5% by weight of an electrostatic ink composition, in some examples 50% to 99.5% by weight of an electrostatic ink composition. Before printing, the carrier liquid may constitute about 40 to 90% by weight of an electrostatic ink composition. Before printing, the carrier liquid may constitute about 60% to 80% by weight of an electrostatic ink composition. Before printing, the carrier liquid may constitute about 90% to 99.5% by weight of an electrostatic ink composition, in some examples 95% to 99% by weight of an electrostatic ink composition.

An electrostatic ink composition, when printed on a primer layer of the substrate may be substantially free from carrier liquid. In an electrostatic printing process and/or afterwards, the carrier liquid may be removed, e.g. by an electrophoresis processes during printing and/or evaporation, such that substantially just solids are transferred to the primer layer of the substrate. Substantially free from carrier liquid may indicate that the ink printed on the primer layer of the substrate contains less than 5 wt % carrier liquid, in some examples, less than 2 wt % carrier liquid, in some examples less than 1 wt % carrier liquid, in some examples less than 0.5 wt % carrier liquid. In some examples, the ink printed on a primer layer of the substrate is free from carrier liquid.

Charge Director and Charge Adjuvant

A liquid electrophotographic composition and/or the ink composition printed on the primer layer of the substrate can comprise a charge director. A charge director can be added to an electrostatic composition to impart a charge of a desired polarity and/or maintain sufficient electrostatic charge on the particles of an electrostatic ink composition. The charge director may comprise ionic compounds, including, for example, metal salts of fatty acids, metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc. The charge director can be selected from oil-soluble petroleum sulfonates (e.g. neutral Calcium Petronate™, neutral Barium Petronate™, and basic Barium Petronate™), polybutylene succinimides (e.g. OLOA™ 1200 and Amoco 575), and glyceride salts (e.g. sodium salts of phosphated mono- and diglycerides with unsaturated and saturated acid substituents), sulfonic acid salts including, for example, barium, sodium, calcium, and aluminium salts of sulfonic acid. The sulfonic acids may include, for example, alkyl sulfonic acids, aryl sulfonic acids, and sulfonic acids of alkyl succinates (e.g. see WO 2007/130069). The charge director can impart a negative charge or a positive charge on the resin-containing particles of an electrostatic ink composition.

The charge director can comprise a sulfosuccinate moiety of the general formula: [$R_a$—O—C(O)CH$_2$CH(SO$_3^-$)C(O)—O—$R_b$], where each of $R_a$ and $R_b$ is an alkyl group. In some examples, the charge director comprises nanoparticles of a simple salt and a sulfosuccinate salt of the general formula MA$_R$, wherein M is a metal, n is the valence of M, and A is an ion of the general formula [$R_a$—O—C(O)CH$_2$CH(SO$_3$)C(O)—O—$R_b$], where each of $R_a$ and $R_b$ is an alkyl group, or other charge directors as found in WO2007130069, which is incorporation herein by reference in its entirety. As described in WO2007130069, the sulfosuccinate salt of the general formula MA$_n$ is an example of a micelle forming salt. The charge director may be substantially free or free of an acid of the general formula HA, where A is as described above. The charge director may comprise micelles of said sulfosuccinate salt enclosing at least some of the nanoparticles. The charge director may comprise at least some nanoparticles having a size of 200 nm or less, in some examples 2 nm or more. As described in WO2007130069, simple salts are salts that do not form micelles by themselves, although they may form a core for micelles with a micelle forming salt. The ions constructing the simple salts are all hydrophilic. The simple salt may comprise a cation selected from Mg, Ca, Ba, $NH_4$, tert-butyl ammonium, $Li^+$, and $Al^{+3}$, or from any sub-group thereof. The simple salt may comprise an anion selected from $SO_4^{2-}$, $PO^{3-}$, $NO_3^-$, $HPO_4^{2-}$, $CO_3^{2-}$, acetate, trifluoroacetate (TFA), Cr, Bf, F, $ClO_4^-$, and $TiO_3^{4-}$, or from any sub-group thereof. The simple salt may be selected from $CaCO_3$, $Ba_2TiO_3$, $Al_2(SO_4)$, $Al(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, Tert-butyl ammonium bromide, $NH_4NO_3$, LiTFA, $Al_2(SO_4)_3$, $LiClO_4$ and $LiBF_4$, or any sub-group thereof. The charge director may further comprise basic barium petronate (BBP).

In the formula $[R_a—O—C(O)CH_2CH(SO_3)C(O)—O—R_b]$, in some examples, each of $R_a$ and $R_b$ is an aliphatic alkyl group. In some examples, each of $R_a$ and $R_b$ independently is a $C_{6-25}$ alkyl. In some examples, said aliphatic alkyl group is linear. In some examples, said aliphatic alkyl group is branched. In some examples, said aliphatic alkyl group includes a linear chain of more than 6 carbon atoms. In some examples, $R_a$ and $R_b$ are the same. In some examples, at least one of $R_a$ and $R_b$ is $C_{13}H_{27}$. In some examples, M is Na, K, Cs, Ca, or Ba. The formula $[R_a—O—C(O)CH_2CH(SO_3^-)C(O)—O—R_b]$ and/or the formula $MA_n$ may be as defined in any part of WO2007130069.

The charge director may comprise (i) soya lecithin, (ii) a barium sulfonate salt, such as basic barium petronate (BPP), and (iii) an isopropyl amine sulfonate salt. Basic barium petronate is a barium sulfonate salt of a 21-26 hydrocarbon alkyl, and can be obtained, for example, from Chemtura. An example isopropyl amine sulphonate salt is dodecyl benzene sulfonic acid isopropyl amine, which is available from Croda.

In an electrostatic ink composition, the charge director can constitute about 0.001% to 20%, in some examples 0.01 to 20% by weight, in some examples 0.01 to 10% by weight, in some examples 0.01 to 1% by weight of the solids of an electrostatic ink composition and/or ink composition printed on the primer layer of the substrate. The charge director can constitute about 0.001 to 0.15% by weight of the solids of a liquid electrophotographic ink composition and/or ink composition printed on the primer layer of the substrate, in some examples 0.001 to 0.15%, in some examples 0.001 to 0.02% by weight of the solids of a liquid electrophotographic ink composition and/or ink composition printed on the primer layer of the substrate. In some examples, a charge director imparts a negative charge on an electrostatic ink composition. The particle conductivity may range from 50 to 500 pmho/cm, in some examples from 200-350 pmho/cm.

A liquid electrophotographic ink composition and/or ink composition printed on the primer layer of the substrate can include a charge adjuvant. A charge adjuvant may be present with a charge director, and may be different to the charge director, and act to increase and/or stabilise the charge on particles, e.g. resin-containing particles, of an electrostatic composition. The charge adjuvant can include, for example, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Cu salts of stearic acid, Fe salts of stearic acid, metal carboxylates (e.g. Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock co-polymers of 2-ethylhexyl methacrylate-co-methacrylic acid calcium, and ammonium salts, co-polymers of an alkyl acrylamidoglycolate alkyl ether (e.g. methyl acrylamidoglycolate methyl ether-co-vinyl acetate), and hydroxy bis(3,5-di-tert-butyl salicylic) aluminate monohydrate. In some examples, the charge adjuvant is aluminium di and/or tristearate and/or aluminium di and/or tripalmitate.

The charge adjuvant can constitute about 0.1 to 5% by weight of the solids of a liquid electrophotographic ink composition and/or ink composition printed on the primer layer of the substrate. The charge adjuvant can constitute about 0.5 to 4% by weight of the solids of a liquid electrophotographic ink composition and/or ink composition printed on the primer layer of the substrate. The charge adjuvant can constitute about 1 to 3% by weight of the solids of a liquid electrophotographic ink composition and/or ink composition printed on the primer layer of the substrate.

Other Additives

In some examples, an electrostatic ink composition may include an additive or a plurality of additives. The additive or plurality of additives may be added at any stage of the method. The additive or plurality of additives may be selected from a wax, a surfactant, biocides, organic solvents, viscosity modifiers, materials for pH adjustment, sequestering agents, preservatives, compatibility additives, emulsifiers and the like. The wax may be an incompatible wax. As used herein, "incompatible wax" may refer to a wax that is incompatible with the resin. Specifically, the wax phase separates from the resin phase upon the cooling of the resin fused mixture on a primer layer of the substrate during and after the transfer of the ink film to the primer layer of the substrate, e.g. from an intermediate transfer member, which may be a heated blanket.

Apparatus

In some examples, there is provided a printing apparatus for printing on a substrate, the apparatus comprising:

a receptacle containing a primer composition comprising water, an epoxide crosslinker, polyethyleneimine and a glycol co-solvent, a device to apply the primer composition to the substrate to form a primer layer on the substrate, and an electrostatic printing apparatus to print an electrostatic ink on the primer layer on the substrate.

The device may comprise an analogue printing station for applying the primer composition to the surface of the substrate. In some examples, the device may comprise a direct gravure coating system, a roll coating system, a flexographic printing system, a lithographic printing system, a spray coating system, a screen printing system, for applying the primer composition to a surface of the substrate to form a primer layer on the substrate. In an example, the device is a gravure printing system, for example an offset gravure printing system. The gravure printing system may comprise a gravure roller for receiving the primer composition from a receptacle containing the primer composition, and a primer composition transfer roller for transferring the primer composition from the gravure roller to the print substrate.

In some examples, the printing apparatus may further comprise a drying station for drying the primer composition applied on the substrate, for example, to form a primer layer on the substrate. The drying station may be positioned between the device and the electrostatic printing apparatus.

The drying station may cause at least some of the water and/or co-solvent to evaporate. In some examples, the drying station may heat the primer composition applied on the substrate to a temperature of at least 50° C., or at least 60° C., or at least 70° C., or to at least 80° C., or to at least 90° C., or to at least 95° C. In some examples, the drying station may heat the primer composition applied on the substrate to a temperature from 50° C. to 95° C., or from 80° C. to 95° C., or from 90° C. to 95° C.

In some examples, the printing apparatus may further comprise a drive member for transferring the substrate from the device for applying the primer composition to the substrate to the electrostatic printing apparatus. In an example, the drive member transfers the substrate from the device for applying the primer composition to the substrate to the electrostatic printing apparatus via a drying station. In some examples, the printing apparatus may further comprise a controller in communication with the drive member, for example to control the position of substrate within the printing apparatus.

The electrostatic printing apparatus may comprise a photocharging unit, a photoimaging cylinder, a binary ink developer (BID) unit and an intermediate transfer member (ITM).

The image may initially be formed on a photoimaging plate (also known as a photoconductive member), in this case in the form of photo-imaging cylinder, before being transferred to an intermediate transfer member (ITM) which is in the form of a roller (first transfer), and then from the silicone release layer of the ITM to the primer layer of the substrate.

According to an illustrative example, the initial image is formed on rotating a photo-imaging cylinder by a photo charging unit. Firstly, the photo charging unit deposits a uniform static charge on the photo-imaging cylinder and then a laser imaging portion of the photo charging unit dissipates the static charges in selected portions of the image area on the photo-imaging cylinder to leave a latent electrostatic image. The latent electrostatic image is an electrostatic charge pattern representing the image to be printed. The electrostatic ink is then transferred to the photo-imaging cylinder by a binary ink developer (BID) unit. The BID unit presents a uniform film of electrostatic ink to the photo-imaging cylinder. The electrostatic ink contains electrically charged pigment particles which, by virtue of an appropriate potential on the electrostatic image areas, are attracted to the latent electrostatic image on the photo-imaging cylinder. The electrostatic ink does not adhere to the uncharged, non-image areas and forms a developed toner image on the surface of the latent electrostatic image. The photo-imaging cylinder then has an ink image on its surface.

The developed toner image is then transferred from the photo-imaging cylinder to a release layer of an ITM by electrical forces. The image is then dried and fused on the release layer of the ITM before being transferred from the release layer of the ITM to the primer layer of the substrate. The process may then be repeated, for example, for further ink layers, for example of different colours, to be included in the final image.

Between the first and second transfers, the solid content of the developed toner image is increased and the ink is fused on to the ITM. For example, the solid content of the developed toner image deposited on the release layer after the first transfer is typically around 20%, by the second transfer the solid content of the developed toner image is typically around 80-90%. This drying and fusing is typically achieved by using elevated temperatures and airflow-assisted drying. In some examples, the ITM is heatable.

Fluid Set

In some examples, there is provided a fluid set comprising:
a primer composition, the primer composition comprising water, an epoxide crosslinker, polyethyleneimine and a glycol co-solvent; and
an electrostatic ink.

The primer composition may be any primer composition described herein. The electrostatic ink may be any electrostatic ink described herein. The fluid set may be used for printing on the substrate as described herein, for example, by first applying the primer composition to the substrate, and then printing the electrostatic ink on the primer layer.

In some examples, in the fluid set, the primer composition and the liquid electrostatic ink are each independently provided and/or stored in separate receptacles. In some examples, the receptacles may be sealed and/or have a removable closure. In some examples, the receptacles may be installed in a printing device, for example, the printing apparatus as described herein, to allow administration of the electrostatic ink and the primer composition, for example, in the printing method described herein.

Printed Substrate

In some examples, there is provided a printed substrate, the printed substrate comprising:
a substrate with a primer layer thereon, the primer layer having been formed by priming the substrate with a primer composition comprising water, an epoxide crosslinker, polyethyleneimine and a glycol co-solvent
and an electrostatic ink having been printed thereon on the primer layer.

In some examples, the primer layer comprises crosslinked polyethyleneimine. In some examples, the primer layer comprises polyethyleneimine and an epoxide crosslinker. In some examples, the primer layer comprises epoxide crosslinker, polyethyleneimine and crosslinked polyethyleneimine.

In some examples, the printed substrate comprises crosslinks between the primer layer and the electrostatic ink. In some examples, the printed substrate comprises crosslinked polyethyleneimine and/or crosslinked electrostatic ink and/or polyethyleneimine crosslinked with the electrostatic ink. In some examples, the electrostatic ink comprises a thermoplastic resin, for example a thermoplastic resin comprising a polymer having acidic side groups, and the printed substrate comprises crosslinked polyethyleneimine and/or crosslinked thermoplastic resin and/or polyethyleneimine crosslinked with the thermoplastic resin.

In some examples, the printed substrate does not comprise an overcoat layer, wherein the overcoat layer is defined as any layer disposed on the electrostatic ink.

FIG. 1 provides for an example printed substrate described herein. FIG. 1 comprises a substrate (1); a primer layer (2) on the surface of the substrate; the primer layer having been formed by priming the substrate with a primer composition comprising water, an epoxide crosslinker, polyethyleneimine and a glycol co-solvent; and an electrostatic ink (3) printed on the primer layer.

Examples

The following illustrates examples of the materials, methods and related aspects described herein. Thus, these examples should not be considered as restricting the present disclosure, but are merely in place to teach how to make examples of compositions of the present disclosure. As such, a representative number of compositions and their method of manufacture are disclosed herein.

Materials

Epoxide Crosslinkers:

Indigicot S105™: 3,4-Epoxycyclohexylmethyl 3,4-epoxy-cyclohexanecarboxylate from Lambson;

Erysis GE-25—1,6-Bis(2,3-epoxypropoxy)hexane from CVC Thermoset Specialities;

Erysis EGDGE—2,2'-[Ethylenebis(oxymethylene)]bisoxirane from CVC Thermoset Specialities Polyethyleneimine:

Branched polyethyleneimine 50% by weight in water solution, or neat branched polyethyleneimine average molar mass (GPC)— 25,000 g/mol; pH value— 11-12; density—1.10 g/cm$^3$ as determined by ISO 51757 at 20° C., viscosity—18,000-40,000 mPa·s as determined by ISO 2555 or 200,000 mPa s, respectively; Tradename—Loxanol® MI6730 from BASF or Lupasol® WF Glycol Co-Solvent:

Propylene glycol (PG), boiling point 188.2° C.

Method of Primer Formation

Varying amounts of epoxide crosslinker were mixed with varying amounts of glycol co-solvent. The mixture was shaken for 5-10 minutes before the addition of water. The mixing of water and glycol co-solvent results in the heating of water and glycol co-solvent. The addition of polyethyleneimine is added after the mixture returns back to room temperature. The mixture is further shaken for 10 minutes. The resulting primer compositions can be used for coating within a week of preparation.

Method of Priming

The primer composition may be applied to the substrate using a LaboCombi 400 a laboratory laminator (Nordmeccanica)

The primer may also be applied using an in-line coating, in gravure mode, e.g. using a HP Indigo 20000 or 6xxx press.

Method of Electrostatic Printing

Substrates with a primer layer thereon were printed on using an HP Indigo liquid electrostatic ink (EI)—colours white (W), yellow (Y), magneta (M), cyan (C), black (K) with low to high ink coverage (100-350% including white) using HP indigo digital ser.3 press. Post print film rolls were cured at 70° C. overnight. Electrostatic inks comprise mixed resins Dupont Nucrel® 699 (copolymer of ethylene and 11 wt % methacrylic acid) and Honeywell A-C® 5120 (copolymer of ethylene and 15 wt % acrylic acid) in ratio 4:1 respectively, Isopar™ L Fluid (Exxon Mobil, CAS Number 64742-48-9) and a NCD charge director In these examples, NCD indicates a natural charge director made of three components: KT (natural soya lecithin in phospholipids and fatty acids), BPP (basic barium petronate, i.e., a barium sulfonate salt of a 21-26 alkyl hydrocarbon alkyl, supplied by Chemtura) and GT (dodecyl benzene sulfonic acid isopropyl amine, supplied by Croda). The NCD composition comprises 6.6 wt. % KT, 9.8 wt. % BPP and 3.6 wt. % GT, balance of 80% Isopar.

Phase Separation Testing

Different amounts of PEI, epoxide crosslinker, glycol co-solvent (propylene glycol) and water were mixed. All compositions showed good stability for up to 2 months with no phase separation visible by inspection.

TABLE 1

| | Mixture composition Total amount each component by weight | | | | Visual inspection | | | | | | |
|---|---|---|---|---|---|---|---|---|---|---|---|
| Ex. | PEI [% wt.] | Epoxy [% wt] | PG [% wt.] | Water [% wt.] | 1 day | 2 day | 4 day | 7 day | 14 day | 21 day | 2 month |
| 1 | 1.25 | 2.5$^a$ | 47.5 | 48.75 | ✓ | ✓ | ✓ | ✓ | ✓ | ✓ | ✓ |
| 2 | 1.25 | 1.25$^a$ | 48.75 | 48.75 | ✓ | ✓ | ✓ | ✓ | ✓ | ✓ | ✓ |
| 3 | 1.25 | 5$^a$ | 45 | 53.75 | ✓ | ✓ | ✓ | ✓ | ✓ | ✓ | ✓ |
| 4 | 1.25 | 0.75$^a$ | 49.25 | 48.75 | ✓ | ✓ | ✓ | ✓ | ✓ | ✓ | ✓ |
| 5 | 2.5 | 1.25$^a$ | 48.75 | 47.5 | ✓ | ✓ | ✓ | ✓ | ✓ | ✓ | ✓ |
| 6 | 2.5 | 2.5$^a$ | 47.5 | 47.5 | ✓ | ✓ | ✓ | ✓ | ✓ | ✓ | ✓ |
| 7 | 2.5 | 5$^a$ | 45 | 47.5 | ✓ | ✓ | ✓ | ✓ | ✓ | ✓ | ✓ |
| 8 | 2.5 | 0.75$^a$ | 49.25 | 47.5 | ✓ | ✓ | ✓ | ✓ | ✓ | ✓ | ✓ |
| 9 | 5 | 0.75$^a$ | 49.25 | 45 | ✓ | ✓ | ✓ | ✓ | ✓ | ✓ | ✓ |
| 10 | 7.5 | 0.375$^a$ | 24.625 | 67.5 | ✓ | ✓ | ✓ | ✓ | ✓ | ✓ | ✓ |
| 11 | 7.5 | 0.625$^a$ | 24.375 | 67.5 | ✓ | ✓ | ✓ | ✓ | ✓ | ✓ | ✓ |
| 12 | 2.5 | 1.25$^b$ | 45 | 48.75 | ✓ | ✓ | ✓ | ✓ | ✓ | ✓ | ✓ |
| 13 | 2.5 | 5$^c$ | 45 | 47.5 | ✓ | ✓ | ✓ | ✓ | ✓ | ✓ | ✓ |

✓ denotes no phase separation,
$^a$= S105;
$^b$=Erysis GE 25 and
$^c$= Erysis EGDGE.

Physical Properties of Selected Primer Compositions

PET (polyethylene terephthalate 12 micron) and BOPP (bi-oriented polypropylene) films were primed using the example primer mixtures 6 and 7 as described above. The example primers were compared with Comparative Example primer 1) DigiPrime 050 and 2) Michem In-Line Primer P030. The Example compositions resulted in a similar coat-weight and viscosity as comparative primer DP050. The Example compositions had a lower % NVS compared to both comparative primers, which is advantageous for cost.

TABLE 2

Physical properties of selected primer solution and comparison to two comparative commercial primers DP050 and ILP030

| Primer | Formulation | Viscosity [mm$^2$/sec] | Surface tension [mN/m] | Coat weight [dry gsm] | % NVS |
|---|---|---|---|---|---|
| Comparative Ex.1 DigiPrime050®* (DP050) | 10% PEI, 5% non-epoxy cross-linker | 17 | 69.3 | 0.12 gsm | 10 |
| Comparative Ex.2 Michem® In-Line Primer P030* | EAA | 40 | 42.2 | 0.3 gsm | 28 |
| Ex. 6 | 2.5% PEI, 2.5% S105 | 16 | 44.96 | 0.12 gsm | 3.73 |
| Ex. 7 | 2.5% PEI, 5% S105 | 16 | 45.34 | 0.14 gsm | 6.12 |

Comparison of Priming Conditions

Various priming conditions were assessed for Example 7. In these Examples, the primer composition was applied to the substrate using a LaboCombi laboratory laminator (Nordmeccanica) to form a substrate with a primer layer thereon.

TABLE 3

Details of priming condition - off line (LaboCombi laminator)

| Anilox used [lcm] | Coating speed [m/min] | Oven Temp. [° C.] | Pre-priming corona treatment [W] | Dried film [Y/N] | Transfer [Y/N] |
|---|---|---|---|---|---|
| 160 | 30 | 90, 100, 100 | 700 | N | N |
| 160 | 20 | 90, 100, 120 | 700 | Y | Y |
| 160 | 30 | 90, 120, 120 | 700 | Y | Y |
| 160 | 12 | 80, 80, 80 | 700 | Y | Y |
| 160 | 20 | 80, 100, 110 | 900 | Y | Y |
| 160 | 25 | 70, 90, 90 | 900 | N | N |
| 160 | 25 | 80, 100, 120 | 900 | Y | Y |

As can be seen from Table 3, coating speeds should be lower or equal to 20 m/min at lower over temperatures (e.g. 80 to 100° C.). Increased coating speeds were tested up to 30 m/min, and higher coating speeds required increased oven temperature (e.g. to 120° C.) for good performance. Lower oven temperatures, for example to about 80° C., may be more suitable for the primer compositions comprising reactive epoxide crosslinkers. Priming involving lower oven temperatures may require lower coating speeds, for example to 12 m/min, for good priming.

Ink Transfer Tests

After electrostatic printing, and heating the substrate at 75° C. for 18 hours, ink transfer was assessed for PET films having been primed by different primer compositions.

TABLE 4

| Primer solution used | Formulation | Transfer [Y/N] |
|---|---|---|
| Comparative Ex.1 DP050 | 10% PEI, 5% non-epoxide crosslinker | Y |
| Comparative Ex. 2 ILP030 | EAA | Y |
| Comparative Ex. 3 | PG | N |
| Comparative Ex. 4 | Water 55% + PG 45% | N |
| Comparative Ex. 5 | PG 95% S105 5% | N |
| Ex. 6 | 2.5% PEI, 2.5% S105 | Y |
| Ex. 7 | 2.5% PEI, 5% S105 | Y |
| Ex. 12 | 2.5% PEI 1.25% GE25 | Y |
| Ex. 13 | 2.5% PEI 5% EGDGE | Y |

Post-Printing Testing

Resistance measurements were performed on the films post-print.

Post-printed PET films which had been primed with the Example primer composition 7 showed improved peeling results compared to Comparative Example 1 after being immersed in water at room temperature for 18 hours. This suggests that there is strong and firm ink adhesion to the substrate using the Example 7 primer compared to Comparative Primer Example 1 DP050.

Post-printed PET films primed with Examples 6, 7, 12 and 13 were then further assessed for PET dry peeling; water resistance at room temperature for 18 hr; water resistance in hot water (90° C.) for 30 min; resistance in acetone for 120 minutes and resistance in ethanol for 120 minutes.

Peeling Method

Print quality evaluation (peeling test), measure printed film ink adhesion (peeling) was assessed according to the following procedure:

1.1 A 810 tape from 3M scotch tape for synthetic stock substrates (PET film, PET high barrier film, etc.) is used.
1.2 Tape is attached to the substrate by passing the 2 kg roller over twice over the tape in each direction (total of 4 times).
1.3 Tape is peeled off.
1.4 Results is evaluated according to the ink amount that remains on the substrate after tape is peeled off. Higher value indicated better ink-primer, primer-substrate adhesion and inner primer and ink layer cohesion.

TABLE 5

Post printing on PET dry peeling, water resistance, at room temperature for 18hr and in hot water for 30 min, acetone and ethanol results

| Example | Post print dry Peeling | Water resistance @ RT, 18 h | Water resistance @ 90° C., 30 min | Acetone 120 min | Ethanol 120 min |
|---|---|---|---|---|---|
| #6 | 80% | 98% | 100% | 98% | 100% |
| #7 | 100% | 100% | 100% | 100% | 100% |
| #12 | 50% | 50% | NA | NA | NA |
| #13 | 90% | 80% | NA | NA | NA |

As can be seen from Table 5, Examples #6 and #7 showed particularly good water resistance at room temperature. Examples #12 showed poorer water resistance and example #13 showed moderate water resistance at room temperature as compared to Examples 6 and 7, thus, no further tests were performed on Examples #12 and #13. In particular, Examples 6 and 7, comprising S105 epoxide crosslinker, were found to show high durability to both water and organic solvents.

Further testing was performed with primer compositions based on Example 7 comprising 2.5 PEI, 5% S105).

TABLE 6

| | % PG | Dryers temperatures | Peeling 0-20 min | Water resistance 18 hours, RT | Water resistance 90° C., 30 min | Acetone 120 min | Ethanol 120 min |
|---|---|---|---|---|---|---|---|
| | | | 2.5% PEI, 5% S105 | | | | |
| #14 | 45 | 80, 100, 120 | 100% | 100% | 100% | 100% | 100% |
| #15 | | 80, 80, 80 | 90% | 100% | 100% | 100% | 100% |
| #16 | | 70, 90, 90 | 100% | 100% | 100% | 100% | 100% |
| #17 | 38 | 80, 100, 110 | 90% | 100% | 100% | 100% | 100% |
| #18 | | 80, 100, 120 | 90% | 100% | 100% | 100% | 98% |

While the materials, methods and related aspects have been described with reference to certain examples, it will be appreciated that various modifications, changes, omissions, and substitutions can be made without departing from the spirit of the disclosure. The features of any dependent claim may be combined with the features of any of the other dependent claims or any and/or any of the independent claims.

The invention claimed is:

1. A method of printing on a substrate, the method comprising:
providing a substrate, wherein the substrate has been primed by a primer composition comprising water, an epoxide crosslinker, polyethyleneimine and a glycol co-solvent, the primer composition having formed a primer layer on the substrate; and
printing an electrostatic ink on the primer layer.

2. The method according to claim 1, wherein the substrate comprises a film of a material selected from biaxially orientated polyethylene, biaxially oriented polypropylene (BOPP), polyethylene terephthalate (PET), and oriented polyamide (OPA).

3. The method according to claim 1, wherein the primer layer has a dry coat weight of from 0.05 g/m² to 0.175 g/m².

4. The method according to claim 1, wherein the electrostatic ink comprises a thermoplastic resin, and wherein the thermoplastic resin comprises a polymer having acidic side groups.

5. The method according to claim 1, wherein the epoxide crosslinker crosslinks the polyethyleneimine and/or the electrostatic ink.

6. The method according to claim 1, wherein the epoxide crosslinker comprises an internal epoxide.

7. The method according to claim 1, wherein the epoxide crosslinker comprises at least two epoxycyclohexyl groups.

8. The method according to claim 1, wherein the polyethyleneimine is a branched polyethyleneimine.

9. The method according to claim 1, wherein the glycol co-solvent is propylene glycol.

10. The method according to claim 1, wherein the primer composition includes at least 35 wt. % of the glycol-solvent.

11. The method according to claim 1, wherein the primer composition comprises the polyethyleneimine and the epoxide crosslinker in a ratio of from 2:1 to 1:2 by weight.

12. The method according to claim 1, wherein the primer composition comprises:
from 1 wt. % to 8 wt. % of the polyethyleneimine;
from 0.3 wt. % to 6 wt. % of the epoxide crosslinker;
at least 40 wt. % of the glycol co-solvent; and
a balance of the water.

13. The method according to claim 1, wherein the method includes forming the primer layer on the substrate by applying the primer composition to the substrate, and wherein the electrostatic ink is a liquid electrostatic ink.

14. A printing apparatus for printing on a substrate, the printing apparatus comprising:
a receptacle containing a primer composition comprising water, an epoxide crosslinker, polyethyleneimine and a glycol co-solvent;
a device to apply the primer composition to the substrate to form a primer layer on the substrate; and
an electrostatic printing apparatus to print an electrostatic ink on the primer layer on the substrate.

15. A fluid set, comprising:
a primer composition comprising water, an epoxide crosslinker, polyethyleneimine, and a glycol co-solvent; and
an electrostatic ink.

* * * * *